Feb. 12, 1935.

A. RAMSEY

Re. 19,462

FUSE

Original Filed May 18, 1931 3 Sheets-Sheet 1

Inventor:
Allan Ramsey

By Brown, Jackson, Boettcher & Dienner
Attys.

FUSE

Original Filed May 18, 1931 3 Sheets-Sheet 2

Inventor:
Allan Ramsey
By Brown, Jackson, Boettcher & Dienner
Attys

Feb. 12, 1935. A. RAMSEY Re. 19,462

FUSE

Original Filed May 18, 1931 3 Sheets-Sheet 3

Inventor:
Allan Ramsey.
By Brown, Jackson, Boettcher & Dienner
Att'ys.

Reissued Feb. 12, 1935

Re. 19,462

UNITED STATES PATENT OFFICE 19,462

FUSE

Allan Ramsey, Evanston, Ill., assignor to Schweitzer & Conrad, Inc., Chicago, Ill., a corporation of Delaware Original No. 1,907,581, dated May 9, 1933, Serial No. 538,092, May 18, 1931. Application for reissue May 28, 1934, Serial No. 728,050

40 Claims. (Cl. 200—117)

This invention relates to fuse devices and the like, and I shall illustrate and describe the same in connection with the Schweitzer and Conrad type liquid quenched fuse, but it is to be understood that the invention is not to be limited to such fuse but may be employed wherever found suitable or desired.

It is well known in the art that positiveness and rapidity of operation are great virtues of the type of use above referred to. The positiveness of the device at all times assures positive separation of the circuit terminals upon blowing of the fuse, and the rapidity of operation tends to stop the flow of energy or to open the circuit before too much heat is developed. In order to obtain these characteristics the force of the separating means must be relatively strong.

Devices of the type above referred to include a pair of terminal members, one relatively fixed, and the other movable therefrom and through a suitable liquid for quenching the arc upon fusing of the fusible element which connects the terminal members and is rated to break the circuit at the desired time. The fuse link being relatively weak mechanically is not adapted to take and sustain the full tension of the terminal separating means, which means is commonly in the form of a spring in devices of the above type. To avoid the necessity of a strain wire or the like for taking the tension of this spring to hold the parts in set or closed circuit position, the prior patent of Nicholas J. Conrad, No. 1,779,929, patented October 28, 1930, provides suitable mechanical means for connecting the fuse to the movable terminal member in such manner as to give the fuse a mechanical advantage over the operating means tending to move the movable terminal member away from the relatively fixed terminal member.

My present invention relates to the matter of sustaining the force of the terminal separating means, specifically, in the embodiment of the invention illustrated herein, the tension of the spring for separating the terminals, and its primary object is to provide improved means for giving the fuse a still greater mechanical advantage over the operating means tending to move the movable terminal member away from the relatively fixed terminal member.

Another object is to provide a generally improved compound lever system of simple inexpensive and compact character for giving the fuse this greater mechanical advantage.

Another object is to provide an improved lever system and fuse assembly of unitary character including a terminal member adapted for connection with the adjacent fuse ferrule in the manner of the connection of the upper fuse terminal with that ferrule disclosed in the copending application of Nicholas J. Conrad, Serial No. 470,416, filed July 24, 1930.

A still further object is the provision of a fuse link and lever system assembly adapted for use in connection with the fuse structure disclosed in the copending application above referred to, and still further a fuse link and lever system assembly adapted for disposition in the explosion chamber in the above type of device.

The means which I provide for reducing the force of the spring or other separating means on the fuse link or other sustaining element enables sustaining a strong spring with a relatively light fuse, and at the same time permits play for preventing injury to the fuse link or other sustaining element in case of vibration set up during shipment or use of the fuse.

The device which I have built comprises a system of levers of the second class each pivoted at one end. One lever is adapted to have the force of the separating means applied thereto while another is connected to the fuse link. The free ends of the levers overlap and have engagement in a manner providing a compact assembly, the levers having generally parallel relation in close circuit position, and when the fuse blows the levers are freed and permit free and unrestricted circuit opening movement of the movable fuse terminal.

The levers of the present device have pivoted support independently of the insulating barrier ring and are adapted to be installed as a unitary assembly independently of that ring, and the parts are all held in closed circuit relation in such manner as to avoid any possibility of disconnection due to vibration or the like.

My invention is illustrated in the accompanying drawings, in which.

The fuse herein specifically illustrated and described is of the Schweitzer and Conrad liquid quenched type, and the general construction is of the type disclosed in the copending application of Nicholas J. Conrad, Serial No. 470,416, filed July 24, 1930, but it is to be understood that the invention herein disclosed and claimed is not to be limited to this particular type of fuse.

A fuse of the type above referred to involves a number of features; first, a fusible link between two arcing terminals; second, means for separating the two arcing or fuse terminals upon blowing of the fusible element; third, the production of a quenching effect; and fourth, the matter of sustaining the parts in set or closed circuit position.

As already pointed out, positiveness and great rapidity of operation are great virtues of the type of fuse above referred to. In order to obtain these it is desirable that the force of the separating means be relatively strong, and this requires sustaining means capable of sustaining this relatively strong separating force without impairing the reliability, positiveness or rapidity of operation. This matter of sustaining a relatively strong separating force without impairing the reliability or postiveness and rapidity of operation is the chief problem which I have solved by the present invention.

The means for and manner in which I accomplish this will now be explained in conjunction with one construction embodying my present invention. This means enables sustaining a strong spring with a relatively light or relatively weak fuse element but, as already pointed out, it is to be understood that a strain wire or other means may be employed for holding the fuse terminals in definite relation to each other, and that in such case the means of the present invention will operate similarly to reduce the force imposed upon such means by the separating means.

Figure 1:
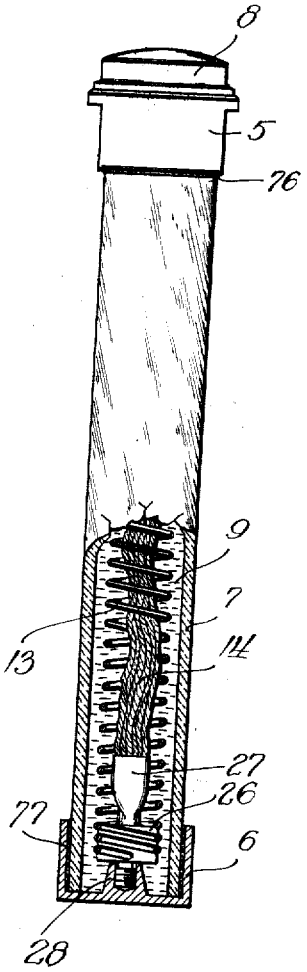
Figure 1 is a side elevational view of a fuse embodying the present invention with a part of the glass sleeve forming the fuse casing broken away and the lower ferrule in section to reveal the tension spring, the stranded flexible conductor and the attachment of the spring and conductor to the lower ferrule.

Referring now to the drawings, the fuse illustrated is constructed as a generally elongated cylindrical body having metal ferrules 5 and 6 (Figure 1) secured upon the upper and lower ends of a glass sleeve 7. The upper ferrule 5 is formed with an open top which is closed by a cap 8 adapted to be removable under certain circumstances involved in the operation of the fuse. The sleeve, ferrules and cap thus form a closed chamber or casing within which is contained a body of arc extinguishing liquid 9. Suitable arcing or fuse terminals such as 10 and 11 (Figure 2) are connected and held in definite relation to each other by a fuse element assembly indicated in its entirety at 12. A relatively strong tension spring 13 is connected between the movable terminal 11 and the ferrule 6, and a flexible conductor or cable 14 serves as a current carrying conductor between the movable terminal 11 and the lower ferrule or external terminal 6.

The upper end of the flexible conductor 14 is fastened in a tubular socket 15, this socket having a head 16 at its upper end, which head is provided with an annular shoulder 17. A flanged ring 18 which is grooved on its outer periphery to receive the coils of the spring 13 has the inwardly extending flange 19 loosely embracing the cylindrical portion 20 above the shoulder 17. The opening through the top of the ring 18 may be counterbored at 21 and the socketed member may have a shoulder 22 fitting therein. The upper end of the socketed member 15 has an externally threaded stud 23 which is threaded into the lower internally threaded end 24 of the cylindrical arcing terminal 11, the lower end of the terminal 11 being adapted to seat upon the shoulder 25 on the socketed member 15 upon setting the two parts together. The lower end of the terminal 11 forms an annular retaining shoulder for preventing disengagement of the head 16 and the flanged ring 18. The lower ends of the conductor 14 and spring 13 are anchored on the inside of the lower ferrule 6 by a grooved head 26 and socket 27 formed integral therewith or may be otherwise secured to the ferrule 7 electrically and mechanically. In the illustrated embodiment (Figure 1) the end wall of the ferrule 6 has a socket 28 extending axially within the sleeve 7 and the head 26 has a stud threaded into the socket 28.

The flexible conductor 14 is of high conductivity to shunt the spring 13 to prevent any serious flow of current therethrough which might injure the spring. At the same time it is sufficiently soft and flexible to be readily collapsed by the tension spring 13.

Figure 8:
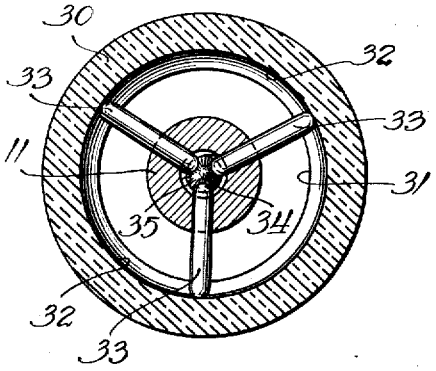
Figure 8 is a sectional view through the liquid director taken on the line 8—8 of Figure 2.
Figure 2:
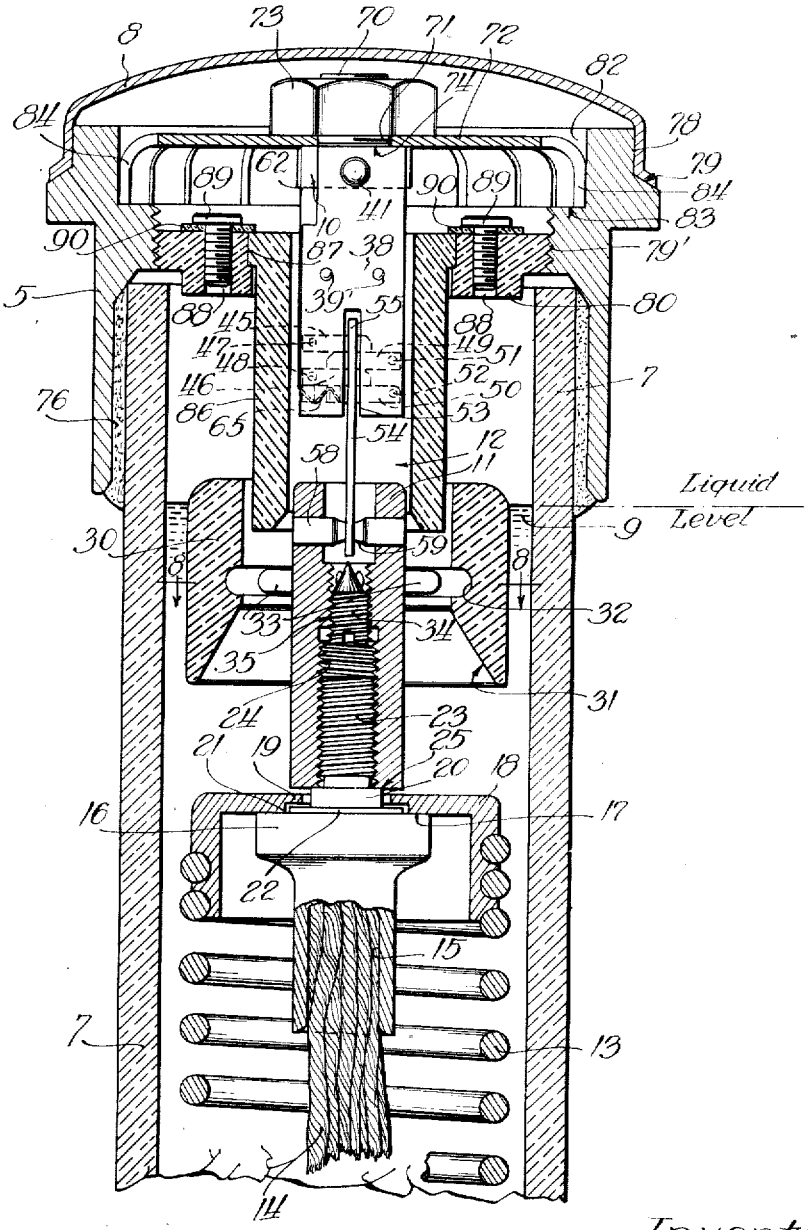
Figure 2 is an enlarged vertical section through the upper end of the fuse.
Figure 3:
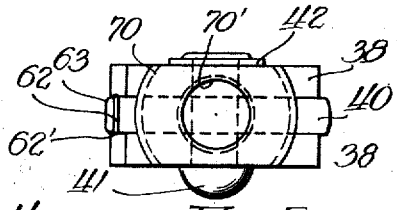
Figure 3 is a top plan view of the fuse element and upper arcing terminal assembly.
Figure 4:
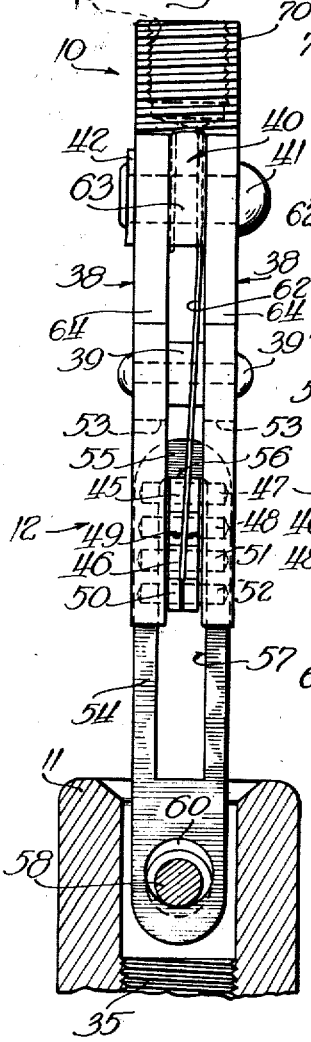
Figure 4 is a side elevational view of the fuse element and upper arcing terminal assembly, and shows the upper end of the movable terminal in section.
Figure 5:
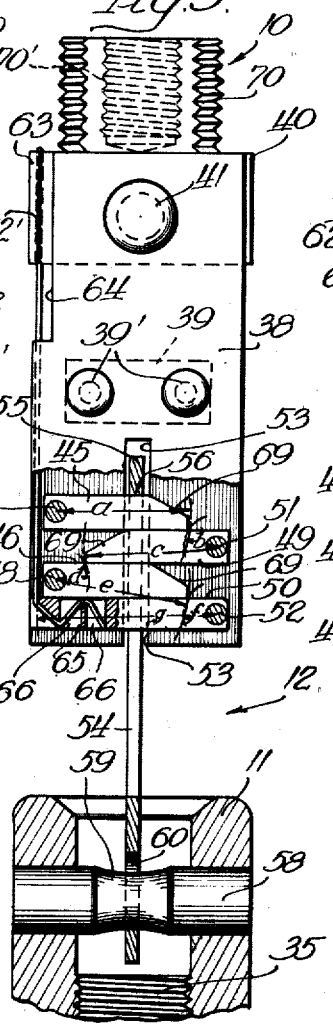
Figure 5 is a front elevational view of the fuse element and upper arcing terminal assembly with one of the side plates broken away to reveal the lever system for reducing the force imposed upon the sustaining means by the spring and with the upper end of the movable terminal in section.

The terminal or stud 11 which is shown in section in Figure 2 has means for securing thereto the liquid director 30, the form of which director and the location of the same being subject to considerable variation. The liquid director comprises a short cylinder of insulating material provided with a flared inlet opening 31 and a groove 32 by means of which it is mounted upon the arcing or fuse terminal 11. The groove 32 is engaged by a series of pins, three in number, in the illustrated embodiment (Figure 8) which pins 33 have their ends rounded and their outer ends pressed into the groove 32 by an expanding screw 34, which is a pointed grub-screw carried in the threads 35 within the terminal 11.

The fuse element assembly designated generally at 12 comprises a pair of generally rectangular side plates 38, 38, preferably made of insulating material and spaced apart by an intervening spacer 39 and secured together by rivets 39′ passing through the plates 38, 38 and spacer 39 and headed at their ends. In the illustrated embodiment spacer 39 and rivets 39′ are of copper, but this may vary. The relatively stationary arcing terminal 10 is formed of copper rod with its lower end 40 flattened and secured between the upper ends of the side plates 38, 38 by a rivet 41, a copper washer 42 being provided at the end of the rivet 41 which is headed or riveted over in securing the base of the terminal 10 between the plates 38.

The force reducing leverage comprises a pair of lever arms 45, 46 pivoted between the plates 38 along one edge thereof at 47, 48, respectively, and a second pair of lever arms 49, 50 pivoted between the plates 38 along the opposite edge thereof at 51, 52, respectively. The free ends of the levers 45, 46 overlap the free ends of the levers 49 and 50 with the free end of the lever 49 engaging between the free ends of the levers 45 and 46 and the free end of the lever 46 engaging between the free ends of the levers 49 and 50. All of said levers have generally parallel compact relation transversely of the plates 38 in the set or closed circuit position of the device. The lower ends of the plates 38 are slotted at 53 and connecting link 54 enters the slotted ends of said plates and applies the force of the tension of the spring 13 to the upper lever 45 by engagement of the upper end 55 of the link 54 with the lever 45 at 56. The levers 45, 46, 49 and 50 pass through the slot 57 in the link 54, and the lower end of the link 54 enters the bore in the upper end of the movable terminal 11, there being a cross pin 58 secured at its opposite ends in the terminal 11 and provided with a reduced intermediate portion 59 passing loosely through an opening 60 in the lower end of the link 54 for loosely anchoring the lower end of the link 54 in the terminal 11. The free ends of the pivoted levers passing through the slot in the link 54 serve to hold this link in place when the fuse is operatively connected.

The fusible link 62, which may be in the form of a relatively weak fusible wire, is connected at one end electrically and mechanically to the terminal 10 as by placing it in a groove 62' in the projecting side 63 of the base 40 of the terminal 10 and battering or crushing the metal along this groove into firm gripping engagement with the wire. From the end thus attached to the upper terminal 10 the fuse link 62 passes down generally between the side plates 38 along the notches 64 therein and along the pivoted ends of the levers 45 and 46, and is firmly secured mechanically and electrically at 65 to the free end of the lower lever 50 as by inserting the end of the wire 62 in apertures 66 and battering or pressing the metal of the lever along apertures 66 into firm engagement with the wire.

From the foregoing it will now be apparent that the upper lever 45 takes the tension of the spring 13 by engagement of the upper end of the link 54 therewith at 56. This force is transmitted through relatively long radius *a* of lever 45 to lever 49 which takes the reduced force through relatively short radius *b* and transmits the reduced force through relatively long radius *c* to the lever 46. The lever 46 takes the further reduced force through reduced relatively short radius *d* and transmits this force through relatively long radius *e* to the lower lever 50 which takes the further reduced force through the reduced radius *f* and imposes a still further reduced force upon the fuse element 62 or other sustaining element through relatively long radius *g*. Obviously the particular number of levers 45, 46, 49 and 50 may be decreased or increased, and the particular force reducing leverage may otherwise be varied widely within the scope of this invention. The particular arrangement shown is simple and exceedingly compact, and is particularly adapted for use with the type of fuse herein disclosed. It is adapted to take the tension or force of a strong terminal separating spring and to reduce the same very greatly so that a relatively light or relatively weak fuse element may sustain such a spring.

In the illustrated embodiment of the invention the levers 45, 46, 49 and 50 and the link 54 are in series with the fusible element 62, and the levers are therefore preferably formed of hard drawn copper wire or other suitable conducting material, whereas the link 54 is of cold rolled copper strip or other suitable conducting material.

The great reduction in force provided by the lever system of the present invention gives the fuse a much greater mechanical advantage than heretofore possible and enables sustaining a stronger spring 13 directly with a relatively light fuse link. Furthermore, the arrangement of the pivoted levers and link 54 permits play in the spring sustaining means which in turn prevents injury to the fuse link 62 by vibration set up during shipment or use of the fuse. The free ends of the levers 45, 46 and 49 are chamfered off at 69 to permit compact relationship of the pivoted levers and at the same time full freedom of the link 54 upon melting of the fuse link 62.

The upper terminal 10 has a threaded stem 70 which has its sides slabbed off to provide means for holding the same against rotation. This stem passes through a central non-circular opening 71 in the flanged plate 72. The non-circular opening 71 holds the stem 70 against rotation which relieves the link 54 of twisting stresses and permits the clamping nut 73 to be threaded upon the stem 70 for the purpose of drawing the shoulder 74 against the bottom of the plate 72. This provides good mechanical and electrical connection between the upper stud or terminal 10 and the plate 72. The upper end of the stem 70 has a threaded socket 70' for the attachment of a tool used to draw the stem through the hole in the plate 72.

The upper terminal or ferrule 5 is provided with a cylindrical socket into which the upper end of the glass sleeve is placed and secured by means of a metal or other seal 76, providing a somewhat elastic fluid-tight joint. The lower terminal or ferrule 6 is provided with a cylindrical socket into which the lower end of the glass sleeve is placed and secured by means of a metal or other seal 77 providing a similar somewhat elastic fluid-tight joint.

The sides of the upper terminal 5 and likewise of the lower terminal 6 are slabbed off to provide parallel contact surfaces for the engagement of a suitable fuse mounting, for example, of the type shown in the prior patent of Nicholas J. Conrad, No. 1,665,446.

The upper end of the ferrule 5 has a cylindrical seal portion 78 and a conical shoulder portion 79 engaged by corresponding portions of the cap 8 and sealed with cementitious material of suitable character to maintain a fluid-tight joint which will not deteriorate when exposed on the inside to arc extinguishing liquid such as carbon tetrachloride, or other arc extinguishing liquid such as trichloroethylene in mixture with a halogen derivative of a hydrocarbon, nor to external weathering as by water. On the interior of the terminal 5 there is a threaded bore 79' for receiving a threaded mounting plate 80 which is preferably made of insulating material, this plate being apertured at the center so that it has the form of a ring, which ring may be termed a barrier ring.

Figure 7:
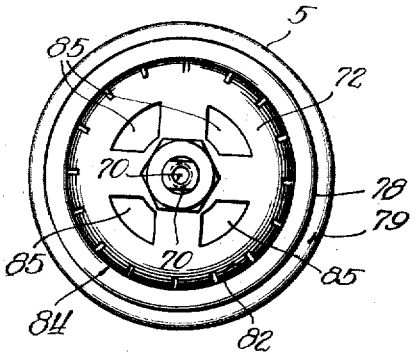
Figure 7 is a top plan view of the fuse with the cap removed.

Above the threaded portion there is a counterbore 82 terminated in a radially extending shoulder 83. The terminal plate 72, which is preferably of hard copper or brass, has a cylindrical flange 84 suitably slotted so as to provide spring fingers. The plate may be provided with apertures 85 (Figure 7) to permit equalization of pressure upon opposite sides thereof, the completed plate thus resembling a spider. The spring fingers 84 have their lower ends slightly chamfered off so that they may be forced into the counterbore 82 to provide a resilient spring grip against the cylindrical surface of the counterbore and to rest against the shoulder 83. The tension of the spring 13 is thus taken against the ends of the spring fingers 84 and the action of this force is to expand the flanged plate to cause it to grip more securely the counterbore 82.

The ring 80 which is preferably formed of insulating material is provided with a central bore through which extends the fiber tube 86. This tube has a head 87 formed at its upper end and the central bore in the ring 80 has a counterbore for receiving the head 87. This head 87 appears as a flange extending outwardly from the surface of the tube 86. The ring 80 has a plurality of holes 88 therethrough, and in some or all of these holes pins (either cylindrical or threaded) such as the screws 89 are mounted, and they hold under their heads washers 90 formed of insulating material overhanging the flange or head 87 of the tube 86 to hold the tube yieldably in position.

In the illustrated embodiment of the invention the fusible link 62 is a piece of nickel chromium alloy wire. This wire is disposed within the explosion chamber defined by the tube 86, and the character of the force reducing leverage enables disposition of this leverage and the connecting link 54 also within this explosion chamber. The upper end of the tube 86 is open above the ring 80 and the transmission of pressure to the space under the plate 72 and through the openings 85 in the plate 72 to the cap 8 is relatively free. In the fuse illustrated in Figure 2 the liquid level is normally carried about even with the top of the lower arcing terminal 11, and the fusible link 62 is disposed substantially above the liquid. Being thus enclosed in air, the transmission of heat therefrom will be less rapid during normal operating condition and the capacity of the fuse is not readily affected by variations in outside temperature.

Figure 6:
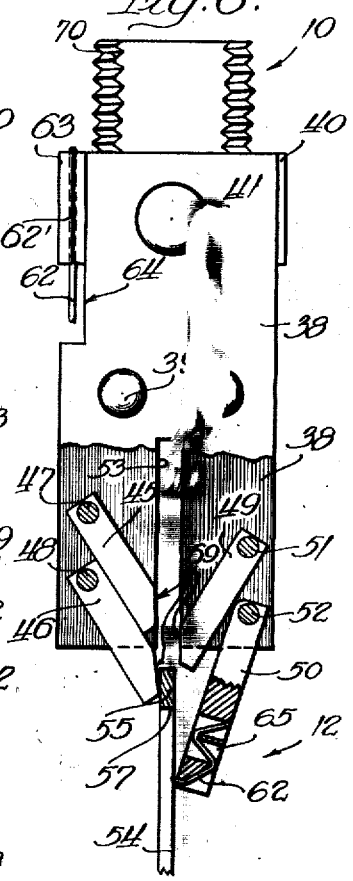
Figure 6 is a view similar to Figure 5 showing the position of the parts upon melting of the fuse link.

Assume that the fuse has been subjected to overload of sufficient amount to cause the fusible wire 62 to be melted and an arc to form. As soon as the metal of the fuse link has sufficiently softened to permit the tension of the spring 13 to separate the terminal 11 from the terminal 10 the lower lever 50 is freed and the downward motion of the terminal 11, link 54 and liquid director 30 immediately begins. The levers are swung about their respective pivots, as shown in Figure 6, to permit free and unrestricted downward movement of the link 54. While the liquid director 30 is not absolutely tight in the glass sleeve 7, it operates nevertheless like a piston, causing liquid to be projected upwardly through the annular space between the liquid director and the terminal 11, this liquid playing upon the arc as the same is lengthened by the downward motion and tending to chill and quench the same.

If the pressure generated by the blowing of the fuse is sufficient to remove the cap 8, the plate or spider 72 then bars the only free outlet from the explosion chamber 86 to atmosphere and if the violence of discharge is sufficient, the plate or spider 72 and its terminal 10 will be discharged, leaving the outlet of the chamber 86 free to atmosphere. As the terminal 11 descends the arc will tend to create pressure below the explosion chamber, and if this pressure is so serious as not to escape through the explosion chamber 86 and the holes through the ring 80, which may be optionally provided, the tube 86 itself may be discharged by shearing off the washers 90. The washers 90 may have a definite holding strength which may be readily predetermined to permit the tube 86 to be expelled and greater freedom of outlet provided.

The fuse may be reset by reassembling the parts, replenishing the arc extinguishing liquid and applying a new fuse wire 62, or an entire new fuse element assembly 12 may be installed.

I do not intend to be limited to the precise details shown and described.

I claim:

1. In combination, a fusible link, terminals for said link, operating means acting to move one of said terminals away from the other, a first lever adapted for receiving the force of said operating means, a second lever connected with said fuse link through a relatively long radius, a third lever between said first and second levers, said first lever transmitting the force of said separating means to said third lever through a relatively long radius and to a relatively short radius of said third lever and said third lever transmitting the force through a relatively long radius to a relatively short radius of said second lever thereby giving the fuse relatively great mechanical advantage over said operating means.

2. In combination, a fusible link, terminals for said link, operating means acting to move one of said terminals away from the other, a first lever adapted for receiving the force of said operating means, a second lever connected with said fuse through a relatively long radius and a pair of levers intermediate said first and second levers, said first lever transmitting the force of said operating means to one of said intermediate levers through a relatively long radius and to a relatively short radius of the intermediate lever and the other intermediate lever receiving said force through a short radius and transmitting same through a relatively long radius to a relatively short radius of the lever connected with the fuse.

3. In combination, a fusible link, terminals for said link, operating means acting to move one of said terminals away from the other, a first lever adapted for receiving the force of said operating means, a second lever connected with said fuse link through a relatively long radius, a third lever between said first and second levers, said first lever transmitting the force of said separating means to said third lever through a relatively long radius and to a relatively short radius of said third lever and said third lever transmitting the force through a relatively long radius to a relatively short radius of said second lever thereby giving the fuse relatively great mechanical advantage over said operating means, all of said levers being mounted upon a common support and swingable in a common plane.

4. In combination, a casing, a fusible link in said casing, terminals for the link, means for separating the terminals upon fusing of the link, a pivoted lever adapted for receiving the force of said separating means, a lever having connection with the fusible link, means for applying the force of said separating means to said first lever, and force reducing lever means between said first and last levers, said force reducing lever means comprising a pair of levers, one adapted to receive the separating force from said first lever, and the other lever adapted to receive and transmit the force to the lever connected with the fuse link.

5. In combination, a casing, a fusible link in said casing, terminals for the link, means for separating the terminals upon fusing of the link, a pivoted lever adapted for receiving the force of said separating means, a lever having connection with the fusible link, means for applying the force of said separating means to said first lever, and force reducing lever means between said first and last levers, said force reducing lever means comprising a pair of levers, one adapted to receive the separating force from said first lever, and the other lever adapted to receive and transmit the force to the lever connected with the fuse link, all said levers being pivoted between a pair of side plates and having generally parallel relation when the fuse link and separating means are operatively connected.

6. In a device of the class described, a fuse element assembly comprising a pair of side plates, an arcing terminal secured between said plates at one end, said plates being slotted at the opposite end, a force reducing leverage between said plates, a connecting link entering the slotted ends of said plates and adapted for applying force to said leverage and a fusible link connected between the arcing terminal and said leverage for sustaining the force applied thereto.

7. In combination, a tubular casing having a releasable end wall and having a metallic ring adjacent said end wall, a spider having resilient engagement with the ring, a relatively stationary terminal carried by the spider, a movable terminal, force reducing means carried by a relatively stationary terminal and connected between said terminal and the movable terminal, a fuse within the casing and connected between said terminals and a spring for retracting the movable terminal upon blowing of the fuse.

8. In combination, a casing, fuse terminals in said casing, operating means acting to separate said terminals, means for sustaining said operating means and a system of levers of the second class for reducing the force imposed upon the sustaining means by said operating means.

9. In combination, a support, levers pivoted at opposite sides of the support with their free ends adapted for overlapping relation, a fuse link connected to hold the free ends of said levers in overlapping relation, a movable terminal held against movement by the overlapping relation of said levers, operating means acting to move the movable terminal, said levers giving the fuse link a mechanical advantage over said operating means and said levers being swingable out of overlapping relation to free the movable terminal upon fusing of the link.

10. In combination, a casing, a fuse link in the casing, terminals for the link, operating means for moving one of the terminals away from the other upon fusing of the link, a connecting link loosely connected to the movable terminal and having an abutment, and a compound lever system comprising a plurality of pivoted levers overlapping across the path of movement of the abutment on said connecting link and operable to give the fuse link a mechanical advantage over the operating means.

11. In combination, a casing, a relatively fixed terminal therein, a movable terminal, operating means for moving the movable terminal from the relatively fixed terminal, a connecting link connected to the movable terminal, said link having an abutment thereon, a compound lever system comprising a plurality of pivoted levers overlapping across the path of movement of said abutment to receive the force of said operating means therethrough, and a fuse link connected between the relatively fixed terminal and said lever system to hold the pivoted levers in the path of said abutment and freeing said levers from said abutment upon fusing of the fuse link.

12. The combination with a movable terminal having a connecting link of a pair of side plates, a terminal member secured between said side plates at one end, said plates being slotted to receive the connecting link at the opposite end, a compound lever system comprising a plurality of levers pivoted between said side plates and a fuse link connected to hold said levers in position across the path of movement of an abutment on the connecting link.

13. In combination, a casing having a releasable end wall, a tubular bushing defining an explosion chamber in the casing near the end wall, said chamber having openings at opposite ends, terminals adjacent said ends, a fuse link in the chamber, spring means for separating the terminals upon melting of the fuse link, said link being connected to sustain said spring means, and releasable pivoted lever means within said tubular bushing for giving the fuse link a mechanical advantage over said spring means.

14. In combination, a casing, fuse terminals in said casing, a tubular bushing defining an explosion chamber in the casing, operating means acting to separate one of the terminals from the other, a fuse connecting said terminals and sustaining said operating means, and releasable pivoted lever means within said tubular bushing for giving the fuse a mechanical advantage over said operating means.

15. In combination, a tubular casing, a tubular bushing defining an explosion chamber disposed coaxially in the casing, a fusible link in the explosion chamber terminals for the link, means for separating the terminals upon fusing of the link and releasable pivoted lever means within said tubular bushing for giving the fuse a mechanical advantage over said separating means.

16. In combination, a tubular casing having a releasable end wall, a transverse partition across the casing adjacent the releasable end wall, a tube coaxial with the casing mounted in the partition and opening through the same, a fuse link assembly disposed in said tube, terminals for said assembly, and means for separating the terminals upon fusing of the link, said fuse link assembly including means within the coaxial tube for giving the fuse a mechanical advantage over said separating means, said means being releasable without increasing its lateral dimension to enable making said means of a lateral dimension closely approximating the inner diameter of the tube without interfering with the operation of said means.

17. In combination, a tubular casing having a releasable end wall and having a metallic ring under the end wall, said ring having a bore terminating in a shoulder, a transverse plate having resilient arms extending longitudinally of said bore and resting on the shoulder, a terminal mounted on said plate, a movable terminal, means for retracting said latter terminal to separate same from said first terminal, a fuse link connecting the terminals and adapted to sustain said retracting means, and a lever system carried by said first terminal and comprising a system of levers giving the fuse link a mechanical advantage over said retracting means and connected in series with said link.

18. In a fuse, the combination of a plate having a cylindrical flange, said flange being slotted to provide a plurality of radially resilient contact fingers, there being a central non-circular opening in the plate, a shouldered stud having a non-circular shank extending through said opening and held against rotation with respect to the plate, means on the shank for clamping the shoulder to the plate, a movable terminal having an internally threaded socket, a fuse within the casing connected between the stud and the movable terminal, a spring for retracting the movable terminal, a flanged ring attached to the spring, said flanged ring having a non-circular opening, a terminal member having one end socketed to receive a conductor within the spring, said member being shouldered and having an externally threaded shank adapted for threaded engagement in the internal threaded socket in the movable terminal member, said shank having a non-circular base extending into the non-circular opening in the flanged ring and held against rotation with respect to the ring thereby.

19. In combination, a casing, a fuse link in the casing, terminals for said fuse link, means for moving one of the terminals away from the other upon the fusing of said fuse link, a slotted link connected to said movable terminal and pivoted lever means positioned through the slot in said link to restrain the means from moving one of the terminals away from the other upon fusing of the fuse link and swingable out of the slot in said link to release said means.

20. In combination, a casing, a fuse link in the casing, terminals for said fuse link, means for moving one of the terminals away from the other upon fusing of said fuse link, and means for restraining said last means, said restraining means comprising a plurality of pivoted levers one receiving the force of the means for moving one of the terminals away from the other terminal upon fusing of the fuse link and transmitting said force through a relatively long radius and another of said levers being connected to said fuse link and receiving said force through a relatively short radius.

21. In combination, a movable member, operating means for moving said member, a first lever adapted for receiving the force of said operating means, a second lever, fusible means for holding said second lever through a relatively long radius, a third lever between said first and second levers, said first lever transmitting the force of said operating means to said third lever through a relatively long radius and to a relatively short radius of said third lever and said third lever transmitting the force through a relatively long radius to a relatively short radius of said second lever thereby giving the fusible means relatively great mechanical advantage over said operating means.

22. In combination, a movable member, operating means for moving said member, a first lever adapted for receiving the force of said operating means, a second lever, fusible means for holding said second lever through a relatively long radius and a pair of levers intermediate said first and second levers, said first lever transmitting the force of said operating means to one of said intermediate levers through a relatively long radius and to a relatively short radius of the intermediate lever and the other intermediate lever receiving said force through a short radius and transmitting same through a relatively long radius to a relatively short radius of the lever held by said fusible means.

23. In combination, a movable member, operating means for moving said member, a first lever adapted for receiving the force of said operating means, a second lever, fusible means for holding said second lever through a relatively long radius, a third lever between said first and second levers, said first lever transmitting the force of said operating means to said third lever through a relatively long radius and to a relatively short radius of said third lever and said third lever transmitting the force through a relatively long radius to a relatively short radius of said second lever thereby giving the fusible means relatively great mechanical advantage over said operating means, all of said levers being mounted upon a common support and swingable in a common plane.

24. In combination, a movable member, operating means for moving said member, a pivoted lever adapted for receiving the force of said operating means, a second lever, fusible means for holding said second lever, means for applying the force of said operating means to said first lever, and force reducing lever means between said first and second levers, said force reducing lever means comprising a pair of levers, one adapted to receive the operating force from said first lever, and the other lever adapted to receive and transmit the force to the lever held by said fusible means.

25. In combination, a movable member, operating means for moving said member, a pivoted lever adapted for receiving the force of said operating means, a second lever, fusible means for holding said second lever, means for applying the force of said operating means to said first lever, and force reducing lever means between said first and second levers, said force reducing lever means comprising a pair of levers, one adapted to receive the operating force from said first lever, and the other lever adapted to receive and transmit the force to said second lever, all said levers being pivoted between a pair of side plates and having generally parallel relation when the fusible means and operating means are in operative relation.

26. In a device of the class described, an assembly comprising a pair of side plates, an anchor member secured between said plates at one end, said plates being slotted at the opposite end, a force reducing leverage between said plates, a link entering the slotted ends of said plates and adapted for applying force to said leverage, and fusible means for sustaining the force applied to said leverage.

27. In combination, a casing, terminals in said casing, operating means acting to separate said terminals, means for sustaining said operating means, and a system of levers of the second class for reducing the force imposed upon the sustaining means by said operating means.

28. In combination, a support, levers of the second class pivoted at opposite sides of the support with their free ends adapted for overlapping relation, fusible means for holding the free ends of said levers in overlapping relation, a movable member held against movement by the overlapping relation of said levers, operating means acting to move the movable member, said levers giving the fusible means a mechanical advantage over said operating means and said levers being swingable out of overlapping relation to free the movable member upon fusing of said fusible means.

29. In combination, a movable member, operating means for moving said member, fusible means for restraining said operating means, a connecting link loosely connected to the movable member and having an abutment, and a compound lever system comprising a plurality of pivoted levers of the second class overlapping across the path of movement of the abutment on said connecting link and operable to give the fusible means a mechanical advantage over the operating means.

30. In combination, a movable member, operating means for moving said member, a connecting link connected to the movable member, said link having an abutment thereon, a compound lever system comprising a plurality of pivoted levers of the second class overlapping across the path of movement of said abutment to receive the force of said operating means therethrough, and fusible means for holding the pivoted levers in the path of said abutment and freeing said levers from said abutment upon fusing of the fusible means.

31. The combination with a movable member having a connecting link of a pair of side plates, an anchor member secured between said side plates at one side, said plates being slotted to receive the connecting link at the opposite end, a compound lever system comprising a plurality of levers pivoted between said side plates and fusible means for holding said levers in position across the path of movement of an abutment on the connecting link.

32. In combination, a movable member, operating means for moving said member, a slotted link connected to said movable member, pivoted lever means positioned through the slot in said link to restrain the operating means from moving said movable member and swingable out of the slot in said link to release said operating means and fusible holding means for normally restraining said pivoted lever means.

33. In combination, a movable member, operating means for moving said member, and means for restraining said last means, said restraining means comprising fusible means and a plurality of pivoted levers of the second class, one receiving the force of the means for moving said movable member upon fusing of the fusible means and transmitting said force through a relatively long radius, and another of said levers being held by said fusible means and receiving said force through a relatively short radius.

34. In combination, a movable member, operating means for moving said member, fusible means for restraining said operating means, and leverage means comprising a plurality of overlapping levers of the second class for giving the fusible means relatively great mechanical advantage over said operating means, said leverage means having shiftable cooperation for reducing the leverage as the operating means operates to move said movable member.

35. In combination, a casing having a ferrule at one end thereof, a tubular bushing defining an arcing chamber in the casing near said one end thereof, a movable terminal, a fuse link in the chamber connecting said terminal and said ferrule, spring means for withdrawing the terminal upon melting of the fuse link, said link being connected to sustain said spring means, and releasable means within said tubular bushing for giving said fuse link a mechanical advantage over said spring means.

36. In combination, a casing, fuse terminals in said casing, a tubular bushing defining an arcing chamber in the casing, operating means acting to separate one of the terminals from the other, a fuse connecting said terminals and sustaining said operating means, and releasable mechanical advantage means within said tubular bushing for giving the fuse a mechanical advantage over said operating means.

37. In combination, a tubular casing, a tubular bushing defining an arcing chamber disposed substantially coaxially in the casing, a fusible link in the arcing chamber, terminals for the link, operating means for separating the terminals upon fusing of the link, and means within said tubular bushing for giving the fuse a mechanical advantage over said operating means.

38. In combination, a tubular casing, a tubular bushing defining an explosion chamber disposed substantially coaxially in the casing, a fusible link in the arcing chamber, terminals for the link, operating means for separating the terminals upon fusing of the link, and means within said tubular bushing for giving the fuse a mechanical advantage over said operating means, said fusible link being of a length not substantially in excess of the distance between the terminals.

39. A renewable unit for a fuse of the class described comprising a pair of aligned electric terminals having readily disconnectible couplings, a fuse electrically connected between the terminals, and a mechanical advantage device between the terminals, said device being controlled by said fuse.

40. In combination, a supporting frame, a plurality of levers of the second class pivoted at spaced points on the frame and having a large percentage of overlap and acting in series to provide a large ratio of leverage, a tension wire attached to and holding the free end of the final one of the levers, said tension wire being adapted to be thermally released, a link acting upon the first of said levers, and means tending to move said link.

ALLAN RAMSEY.

CERTIFICATE OF CORRECTION.

Reissue No. 19,462. February 12, 1935.

ALLAN RAMSEY.

It is hereby certified that error appears in the printed specification of the the above numbered requiring correction as follows: Page 7, first column, line 30, claim 31, for "side" read end; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents